United States Patent [19]

Wolfe et al.

[11] Patent Number: 4,949,573

[45] Date of Patent: Aug. 21, 1990

[54] VELOCITY TRANSDUCER FOR VEHICLE SUSPENSION SYSTEM

[75] Inventors: Paul T. Wolfe, Erie, Pa.; Mark R. Jolly, Raleigh, N.C.

[73] Assignee: Lord Corporation, Erie, Pa.

[21] Appl. No.: 435,709

[22] Filed: Nov. 13, 1989

[51] Int. Cl.⁵ .................................... G01M 19/00
[52] U.S. Cl. .................................... 73/118.1; 73/526
[58] Field of Search .................... 73/118.1, 493, 526, 73/505; 280/707; 310/17

[56] References Cited

U.S. PATENT DOCUMENTS

| | | | |
|---|---|---|---|
| 2,973,969 | 3/1961 | Thall | 280/707 X |
| 4,054,295 | 10/1977 | Elliott | 280/707 X |
| 4,080,592 | 3/1978 | Zabler | 340/199 |
| 4,132,980 | 1/1979 | Zabler | 340/195 |
| 4,351,515 | 9/1982 | Yoshida | 267/8 R |
| 4,365,513 | 12/1982 | Iwasaki | 73/517 R |
| 4,502,006 | 2/1985 | Goodwin et al. | 324/208 |
| 4,638,670 | 1/1987 | Moser | 73/658 |
| 4,802,657 | 2/1989 | Wijnhoven et al. | 267/64.24 |

OTHER PUBLICATIONS

Schaevitz Technical Bulletins 1101 and 1101A Entitled "Linear Velocity Transducers" (5/85 and 1/89).
Lucas Automotive-Sensors.

*Primary Examiner*—Jerry W. Myracle
*Attorney, Agent, or Firm*—Bell, Seltzer, Park & Gibson

[57] ABSTRACT

The transducer is directly associated with a fluid-type damper having a cover member and a cylinder member that undergo telescopic movement relative to each other in response to relative movement between vehicle components interconnected by the damper. In the preferred embodiments, both a passive electrical coil and a magnet are mounted upon the cover member, in fixed relationship to each other. Relative axial telescoping movement between the cover member and the cylinder member of the damper changes the flux field of the magnet and induces in the coil a voltage which is proportional to the relative velocity between the damper members and thus between the vehicle components interconnected by the damper. In an alternative embodiment, the magnet is mounted upon an end portion of the damper cylinder member.

26 Claims, 5 Drawing Sheets

VELOCITY TRANSDUCER FOR VEHICLE SUSPENSION SYSTEM

FIELD OF THE INVENTION

This invention relates to automotive and similar vehicle suspension systems having relatively movable components that are interconnected by a spring and at least one hydraulic damper or shock absorber whose damping characteristic may be rapidly and repeatedly changed in accordance with changes in the relative velocity of the vehicle components, among possibly other parameters. The invention more specifically relates to an improved velocity transducer that is passive, i.e., is not connected to an electrical power source, is integrally associated with the damper and that reliably and accurately monitors the relative velocity between a cover member and a cylinder member of the damper and thus between the relatively movable vehicle components interconnected by the damper.

BACKGROUND OF THE INVENTION

It has heretofore been proposed to monitor the relative velocity between relatively movable components of an automobile or similar vehicle by means of a linear velocity transducer mounted in parallel relationship to a damper interconnecting the vehicle components. Such a transducer typically consists of an outer tubular member that is connected to one of the relatively movable vehicle components and has two serially connected and oppositely-wound coils at spaced locations along its length; and an inner permanent magnet member that is connected to the other of the vehicle components and is located within the outer member. Relative movement between the vehicle components causes corresponding relative movement between the inner and outer transducer members. This generates a voltage in the coils which is proportional to the rate of such movement, and thus to the relative velocity between the vehicle components. Two coils wound in series-opposing relationship are employed since if only a single coil were used, the net voltage would be zero when, as is normally the case, both poles of the magnetic inner member are within the coil.

Another linear velocity transducer that has been previously used, at least experimentally, includes an outer tubular member having a single coil, and an elongate magnet that projects into and from the outer member and is axially movable relative to it. The length of the magnet and of the strokes of relative movement between it and the other member are such that the magnetic pole upon the end of the magnet distal from the outer member never enters the coil of the latter.

U.S. Pat. No. 4,351,515 discloses a velocity transducer associated with a vehicle damper of the type employing solid particles, rather than a fluid, as the damping medium. A permanent magnet is mounted upon an inner member of the damper, and a coil is mounted upon an outer member of the damper. Relative axial movement between the inner and outer damper members generates electrical current in the coil, and this is used to change the intensity of a magnetic field that varies the freedom of movement of the solid particles of the damper.

Apart from and in contrast to passive transducers that monitor or detect relative velocity, there are also active transducers of the "inductance" type that are directly associated with dampers and that detect changes in displacement or position of the relatively movable vehicle components. Illustrative of these active induction-type position sensors are those disclosed in U.S. Pat. Nos. 4,502,006, 4,638,670 and 4,802,657, and in a publication entitled "Lucas Automotive-Sensors."

In addition to the foregoing art, U.S. Pat. Nos. 4,365,513, 4,132,980 and 4,080,592 may be of interest relative to the present invention.

SUMMARY OF THE INVENTION

The velocity transducer of the present invention is associated with and utilizes components of a vehicle damper having a tubular cover member and a cylinder or other primary member that are connected to different ones of the sprung and unsprung vehicle components and undergo axial telescoping movement relative to each other during relative movement between such components. The transducer includes the damper cover member and primary member, which customarily are each formed at least in substantial part of ferrous or other material that is a good conductor of magnetic flux. The transducer further includes a magnet, preferably of the permanent type, and a coil of electrically conductive material that are mounted in fixed relationship to each other upon the damper's cover member for telescoping axial movement relative to the primary damper member during relative movement between the vehicle components interconnected by the damper.

In a preferred embodiment, the magnet is located adjacent the open and customarily lower end of the damper's cover member, is of annular shape, and has an annular pole piece member associated with it. The poles of the magnet preferably are adjacent its radially opposite inner and outer annular surfaces but may be adjacent its axially opposite upper and lower surfaces. In either case, the strength of the magnet desirably is such as to effect substantial magnetic saturation of the ferrous cover member of the damper.

DESCRIPTION OF THE DRAWINGS

Other features of the invention will be apparent from the following description of illustrative embodiments thereof, which should be read in conjunction with the accompanying drawings in which.

DESCRIPTION OF THE PREFERRED EMBODIMENTS

Figure 1:
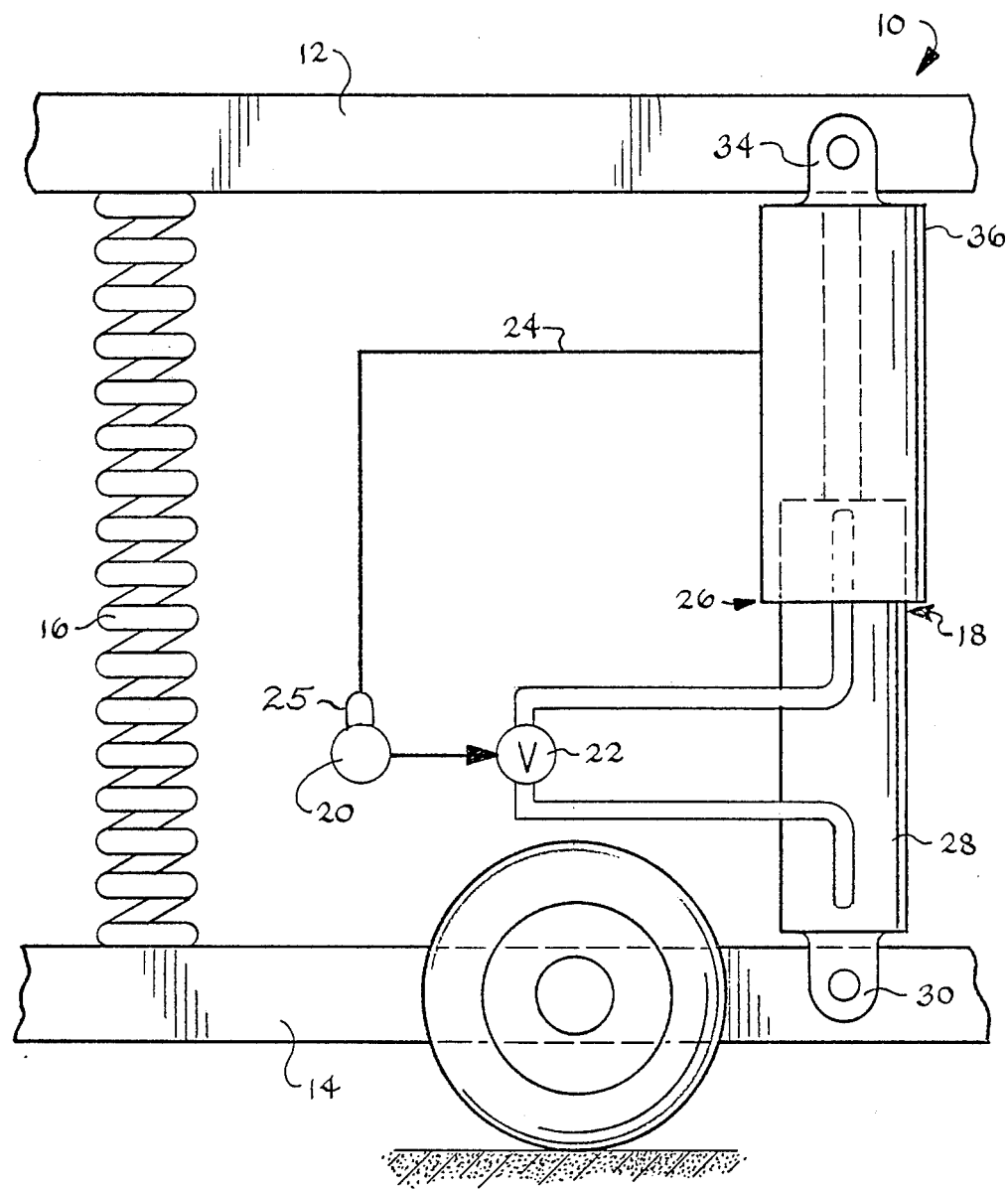
FIG. 1 is a schematic elevational view of a vehicle suspension system having transducer and damper means in accordance with the invention.

The numeral 10 in FIG. 1 designates an automotive or other vehicular suspension system having relatively movable vehicle components 12, 14, such as body and wheel assemblies, interconnected by a spring 16 and a fluid-type damper 18 that extend in parallel relationship to each other. Damper 18 is illustratively of the "semi-active" type whose damping coefficient is rapidly and repeatedly changed during relative movement of the vehicle components. Changes in the damping coefficient are effected by control means 20 that appropriately varies the operating condition of valve means 22, which regulates the freedom of fluid flow between opposite ends of the damper, in response to the dictates of a suitable control policy and input data received by the control means from sensors that monitor the movements of vehicle components 12, 14. Such sensors have heretofore included, among other devices, commercially available linear velocity transducer devices (not shown) that extent between the relatively movable vehicle components in spaced parallel relationship to damper 18. However, the use of commercially available linear velocity transducers in vehicle suspension systems is less than desirable due to their relatively high cost; the expense of their installation, particularly in an area where space is limited; and the likelihood of their incurring damage under the harsh environmental conditions to which they are exposed.

Figure 2:
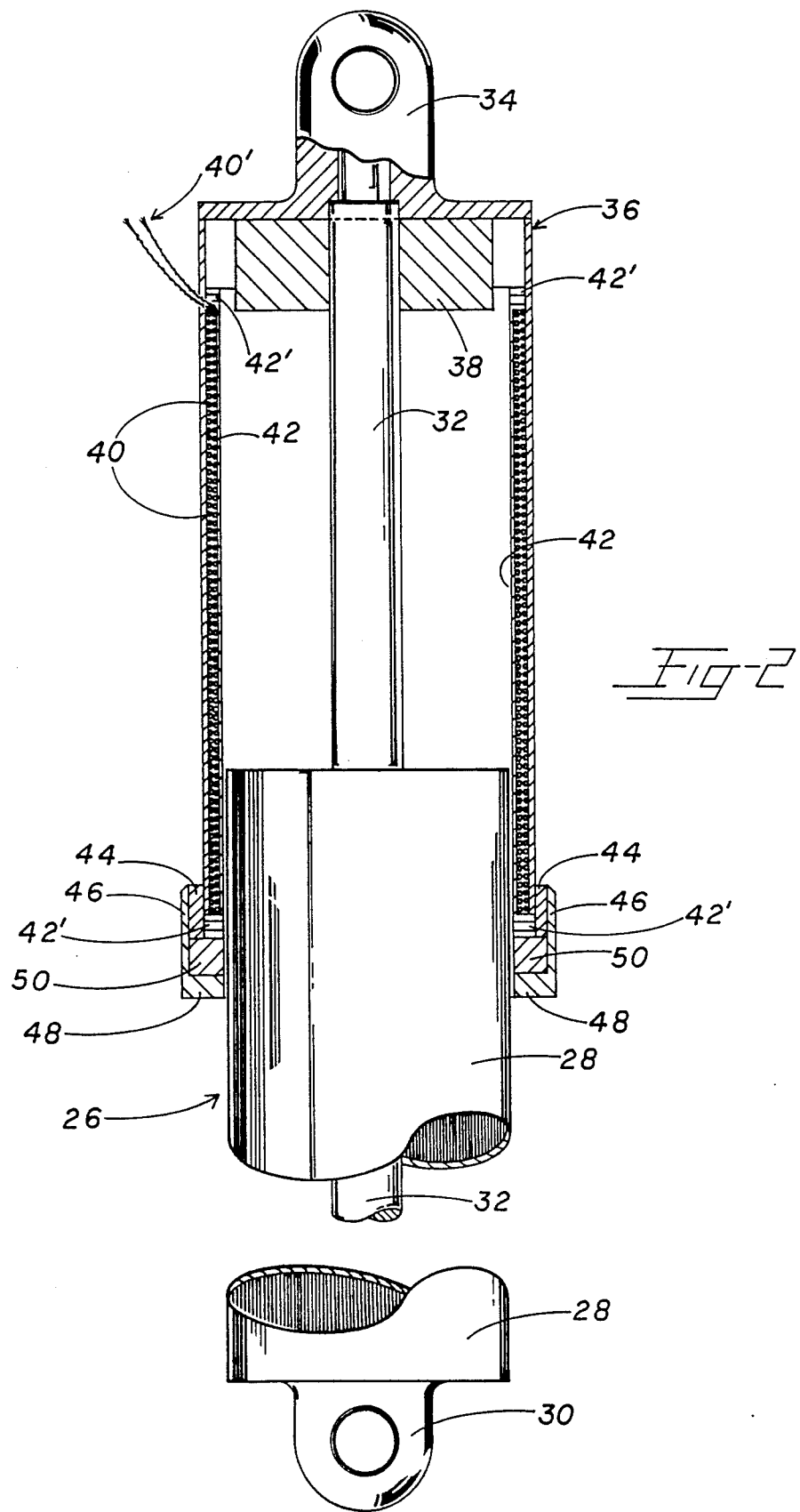
FIG. 2 is an enlarged fragmentary view, partially is side elevation and partially in vertical section, of portions of the transducer and damper means shown in FIG. 1.

In accordance with the present invention, and as is indicated by the connector 24 in FIG. 1, electrical signal data representative of the relative velocity between vehicle components 12, 14 is supplied to control means 20 by a linear velocity transducer 26 associated with and utilizing components of damper 18. Referring now also to FIG. 2 of the drawings, damper 18 is of the piston-and-cylinder type whose primary members include a fluid-containing cylinder 28, and an associated piston rod 32. One end of the cylinder member 28 of the damper is secured, as by means of a suitable fitting 30 (FIG. 1), to one of the relatively movable vehicle components 12, 14, illustratively to wheel assembly component 14. The piston rod 32 projecting from the opposite end of cylinder member 28 is connected adjacent its free end, as by means of a fitting 34, to the other of the vehicle components, i.e., to body component 12 (FIG. 1). A cylindrical cover member 36 of damper 18 is also connected by fitting 34, or by other suitable means (not shown), to vehicle component 12 and thus to piston rod 32. Cover member 36 is concentric with primary member 28 and 32 of damper 18, and is open at its lower end so as to receive the upper end portions of such members. The upper end of cover member 36 preferably is closed and may have a bumper pad 38 associated therewith for the purpose of cushioning impacts that might occur between the upper ends of damper members 28, 36 as such members undergo telescopic axial movement relative to each other as a result of relative vertical movement between the vehicle components 14, 12 to which they are respectively connected. In addition to other functions hereinafter described, cover member 36 performs the traditional function of shielding the upper portions of damper members 32, 38 from impact by dirt, rocks and other foreign material.

The linear velocity transducer 26 associated with damper 18 includes a coil 40 of copper or other electrically conductive wire that is wound, preferably in multiple superimposed layers, upon a cylindrical bobbin 42 formed of nylon or similar plastic material and having outwardly projecting flanges 42' at its opposite ends. Bobbin 42 and thus coil 40 are fixely mounted closely adjacent the inner surface of the cylindrical body of cover member 36, which body is formed of ferrous or other magnetically conductive material. The flanges 42' of bobbin 42 have a press-fit relationship with cover member 36. In addition to preventing axial displacement of coil 40 relative to the bobbin and cover member, the flanges therefore cooperate with the main body of bobbin 42, and the thereto adjacent cylindrical wall of cover member 36, to shield and protect the coil. While coil 40 extends in an axial direction along most of the length of cover member 36, its ends preferably are spaced inwardly from the adjacent ends of cover member 36.

Transducer 26 further includes magnetic means and associated pole-piece means. As shown in FIG. 2, the magnetic means consists of an annular permanent magent 44, which preferably is formed of flexible magnetic tape, that is bonded or otherwise fixedly secured upon and in encircling relationship to the open lower end portion of cover member 36. The opposite poles of permanent magnet 44 are adjacent respective ones of its radially outer and inner cylindrical surfaces. An annular pole piece member 46 is bonded or otherwise suitably secured in encircling engagement with the outer cylindrical surface of magnet 44. Pole piece member 46 projects in an axial direction downwardly from the upper end of magnet 44 past the lower ends of the magnet and of cover 36. At its lower end pole piece member 46 has an inwardly extending flange 48 that underlies and is spaced from the lower ends of magnet 44, cover 36 and bobbin 42. The space between flange 48 and the aforesaid components preferably is occupied by an annular spacer 50 formed of plastic, aluminum or similar material that is a poor conductor of magnetic flux. The radially innermost cylindrical surfaces of bobbin 42, spacer 50 and flange 48 of pole piece member 46 preferably and illustratively are disposed in coplanar relationship to each other and in sufficiently closely spaced adjacent relationship to the outer surface of cylinder member 28 of damper 18 as to minimize passage of water and/or other foreign material upwardly into cover member 36 through its lower end.

Much of the magnetic flux extending between the opposite pole surfaces of magnet 44 passes along a path that includes the axially extending main portion of pole piece member 46, flange 48 of such member, that part of damper cylinder member 28 within damper cover member 36 and/or pole piece member 46, and that part of the cylindrical wall of damper cover member 36 that is adjacent damper cylinder member 28. In passing between the latter two components, the magnetic flux extends through the section of coil 40 that is adjacent the section of damper member 28 within cover member 36. Upon relative axial movement between damper members 28, 36, the nature of the magnetic flux field extending between the adjacent sections of coil 40 and damper member 28 changes. The change is the flux field induces in the coil a voltage which is a function of and substantially directly proportional to the relative axial velocity between damper members 28, 36, and thus to the relative velocity of the vehicle components 12, 14 to which such damper members are connected. Opposite ends 40' of the wire forming coil 40 are connected via connector 24 (FIG. 1) to a suitable device 25 associated directly or indirectly with control means 20 (FIG. 1) and capable of monitoring the voltage induced across coil 40 and therefore the velocity of the relative movement across damper 18. The data thus obtained with respect to the relative velocity across damper 18 reliably ensues even though damper member 28 is not directly engaged by a magnet, or otherwise directly magnetized. Additionally, the relative velocity signal data obtained is not significantly affected by changes in the extent to which damper member 28 projects into cover member 36: thus, a stroke of relative axial movement of a particular velocity between damper members 28, 36 generates substantially the same voltage in coil 40 irrespective of whether the extent to which the damper members are in telescopic relationship is relatively small, as shown in FIG. 2, or is so much greater as to cause the upper end of damper member 28 to be adjacent bumper pad 38 of cover member 36. It is believed that the magnetically saturated condition of damper cover member 36 contributes greatly to realization of the foregoing desirable results.

Figure 3:
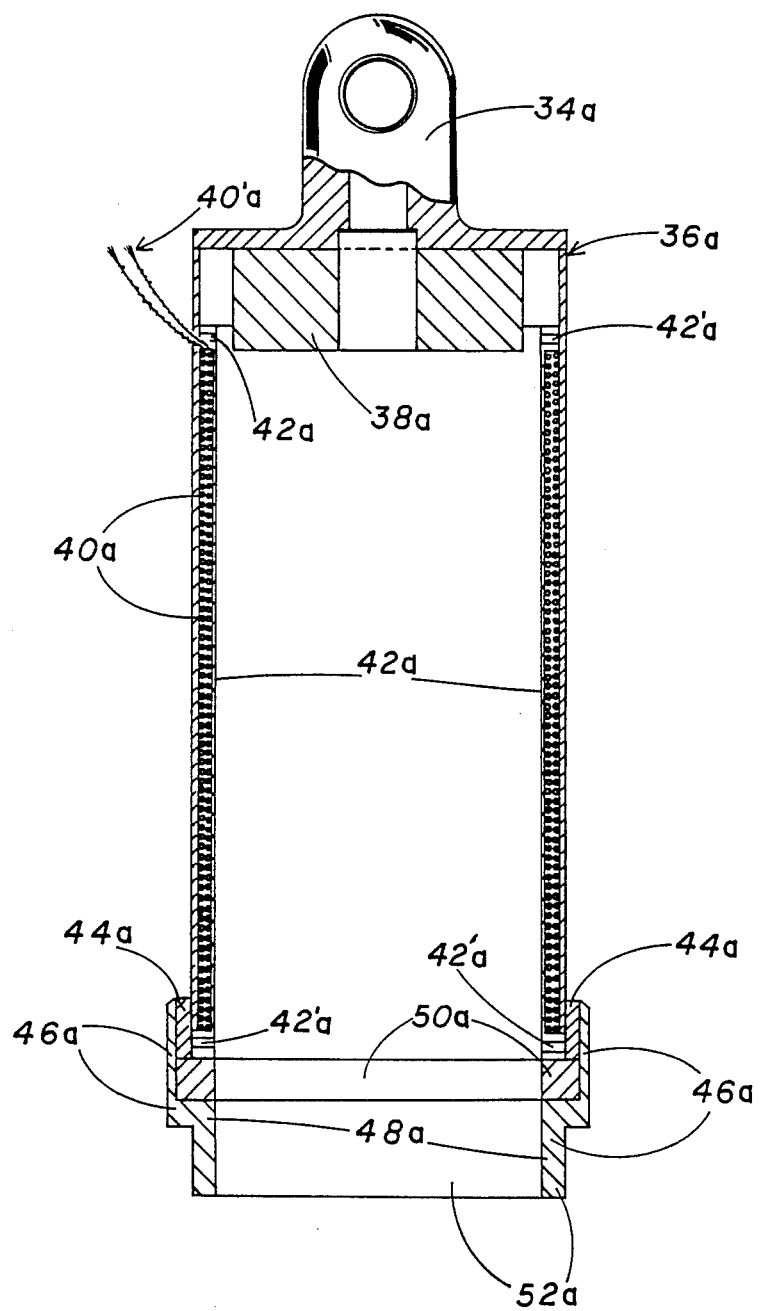
FIG. 3 is a vertical section showing a second embodiment of the components upon the cover member of the transducer and damper means.
Figure 4:
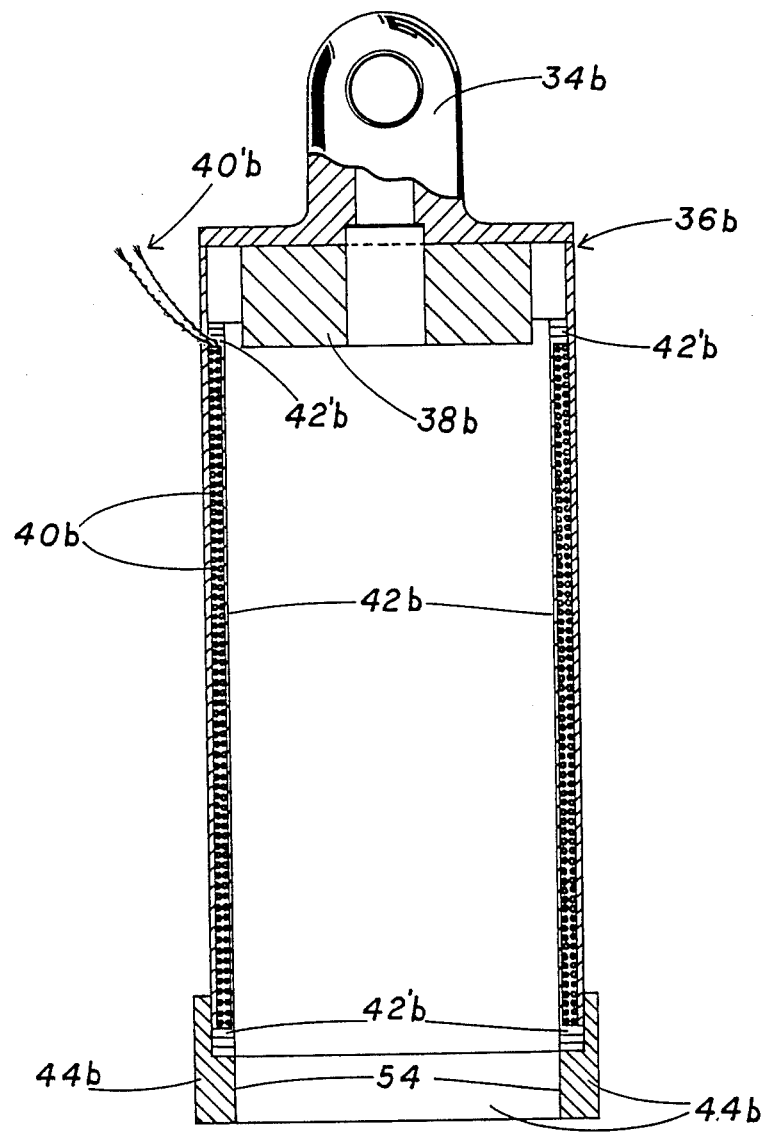
FIG. 4 is a vertical section similar to FIG. 3 showing a third embodiment of the components upon the cover member.
Figure 5:
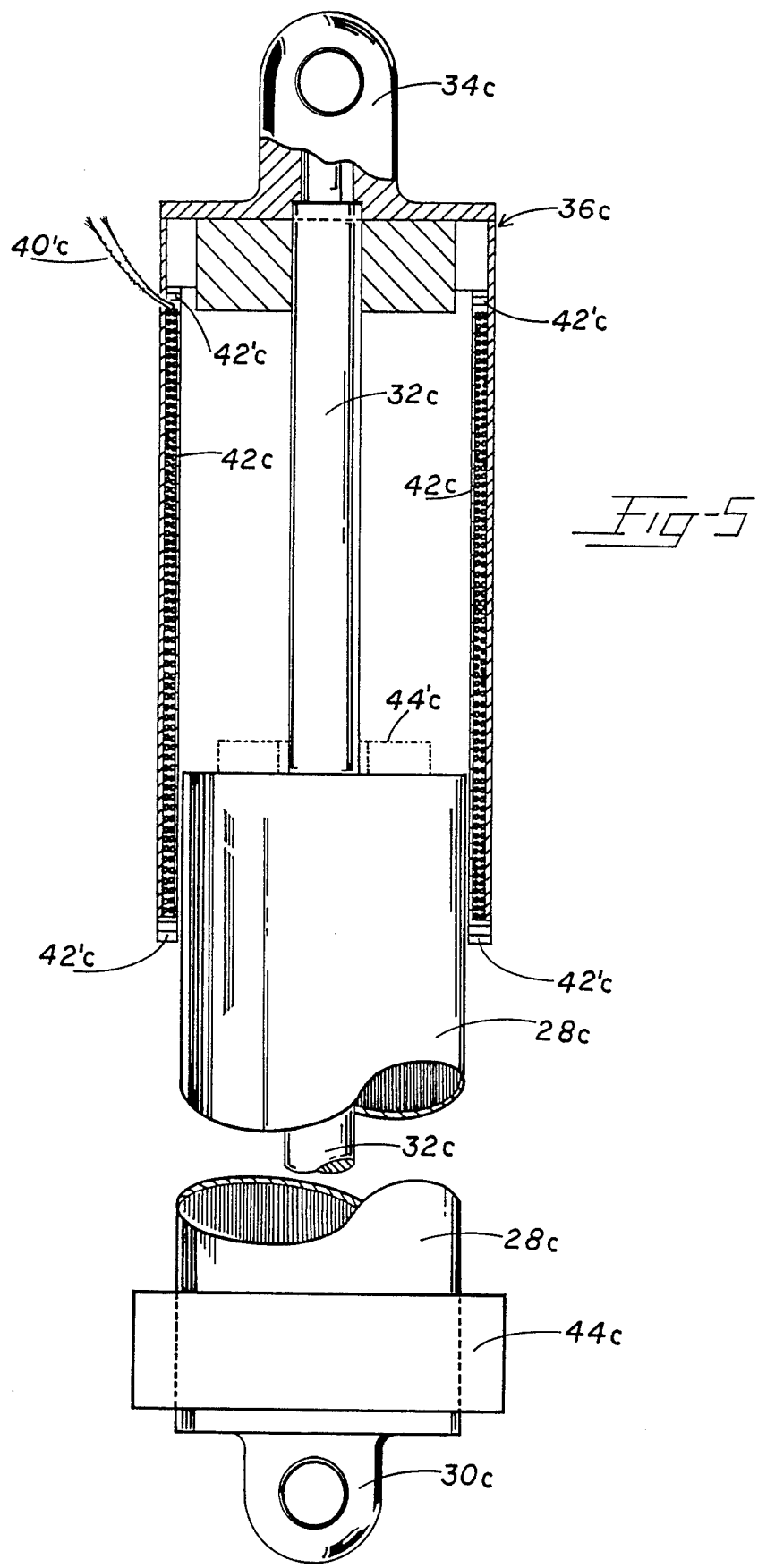
FIG. 5 is a view similar to FIG. 2 of another embodiment of the invention.

Alternative embodiments of some transducer components associated with the cover member of the damper are shown in FIGS. 3, 4 and 5, wherein components identical or similar to those shown in FIG. 2 are identified by the same reference numeral with the addition of suffix letters.

In the construction shown in FIG. 3, the poles of annular magnet 44a are located adjacent its opposite upper and lower end surfaces, and the pole piece member 46a associated with such magnet has an additional annular flange 52 extending vertically downwardly from inwardly extending flange 48a.

In the embodiment of FIG. 4, the opposite poles of annular magnet 44b are also adjacent its opposite upper and lower ends, and the magnet projects at its lower end downwardly beyond the lower end of damper cover member 36b, and has an inwardly extending flange 54 at its lower end. Additionally, the construction shown in FIG. 4 does not include a pole piece or an annular spacer. While the construction of FIG. 4 is easier and less expensive to construct, it is deemed less satisfactory than the constructions of FIGS. 2 and 3 since, among other things, the magnet is more exposed.

The embodiments shown in FIG. 5 differ from the preceding embodiments in that the magnetic means is not mounted upon damper cover 36c, but rather upon cylinder member 28c. The annular permanent magnet 44c shown in solid lines has its poles adjacent its inner and outer cylindrical surfaces, and encircles the lower end portion of cylinder member 28c, which lower end portion never enters cover member 36c. In the alternative construction shown by phantom lines, the axially polarized annular magnet 44'c is mounted upon the upper end of cylinder member 28c in encircling relationship to rod 32c of damper 18. The embodiments of FIG. 5 are less desirable since, among other things, they entail modification of both the cylinder and cover members of the damper, rather than just the cover member.

While specific embodiments of the invention have been shown and described, this was for purposes of illustration only, and not for purposes of limitation, the scope of the invention being in accordance with the following claims.

We claim:

1. A passive velocity transducer for detecting relative velocity between two relatively movable vehicle components interconnected by a fluid-type damper having a central axis, said damper including a cover member connected to one of said vehicle components and a cylinder member connected to the other of said vehicle components, and said damper members undergoing telecoping movement relative to each other during relative movement between said vehicle components, said transducer comprising:

a coil of electrically conductive material carried by said cover member and encircling said axis;
a magnet carried by said cover member.

2. A transducer as in claim 1, wherein said magnet is adjacent one end of said cover member of said damper.

3. A transducer as in claim 2, wherein said magnet is a permanent magnet.

4. A transducer as in claim 2, wherein said magnet projects from said one end of said cover member.

5. A transducer as in claim 1, wherein said magnet is a permanent magnet having first and second opposite poles located at first and second different radial distances from said axis of said damper.

6. A transducer as in claim 5, wherein said magnet is of annular shape and has inner and outer surfaces approximately concentric with said axis, one of said poles being adjacent one of said surfaces and the other of said poles being adjacent the other of said surfaces.

7. A transducer as in claim 6, and further including a ferrous pole piece abutting one of said surfaces of said magnet.

8. A transducer as in claim 7, wherein said magnet is located upon and encircles part of the outermost surface of said cover member, and said pole piece overlies said outer one of said surfaces of said magnet.

9. A transducer as in claim 8, wherein said pole piece is of annular shape and projects in an axial direction beyond said magnet.

10. A transducer as in claim 9, wherein said pole piece has a flange-like portion projecting inwardly toward said axis of said damper.

11. A transducer as in claim 10, wherein said flange portion of said pole piece underlies and is spaced from an end of said cover member.

12. A transducer as in claim 1, wherein said coil is located within said cover member and extend along most of the length of said cover member.

13. A transducer as in claim 12, and further including a bobbin of plastic protective material within said cover member, said coil being shielded and supported by said bobbin.

14. A transducer as in claim 13, wherein said coil is formed of a plurality of layers of said electrically conductive material.

15. A transducer as in claim 1, wherein said cover member is of tubular shape, has an open end confronting and receiving one end of said cylinder member of said damper, and is formed of material capable of conducting magnetic flux; said magnet being of annular shape, and having inner and outer surfaces and opposite poles adjacent respective ones of said surfaces, said inner one of said surfaces overlying and encircling an outer surface portion of said cover member; and further including a pole piece in abutting overlying relationship with said outer one of said surfaces of said magnet.

16. A transducer as in claim 15, wherein said pole piece includes a flange extending inwardly toward said axis of said shock absorber.

17. A transducer as in claim 16, including a spacer of nonmagnetic material between said flange of said pole piece and said magnet.

18. A passive velocity transducer for monitoring relative velocity between first and second vehicle components interconnected by a fluid-type damper having a cover member connected to one of said vehicle components and having a cylinder member connected to the other of said vehicle components, said members of said damper undergoing telescoping movement relative to each other during relative movement between said vehicle components, said transducer comprising:

a coil of electrically conductive material carried by said cover member;

magnet means carried by one of said damper members for generating a magnetic flux field effective, upon relative movement between said damper members, to induce in said coil a voltage substantially proportional to the relative velocity between said damper members and thus between said vehicle components.

19. A transducer as in claim 18 wherein said one of said damper members is said cylinder member.

20. A transducer as in claim 19, wherein said magnet means is mounted upon an end portion of said cylinder member distal from said cover member.

21. A transducer as in claim 19 or 20, wherein said magnet means is made of flexible magnet tape.

22. A transducer as in claim 19, wherein said magnet means is mounted upon an end of said cylinder member located adjacent and normally disposed within said cover member.

23. A transducer as in claim 20 or 22, wherein said magnet means is of annular shape.

24. A transducer as in claim 18, wherein said coil has multiple layers of said electrically conductive material, and is located within said cover member and extends along most of the length thereof; and further including a bobbin formed of plastic material, said coil being wound upon and supported and shielded by said bobbin.

25. A transducer as in claim 24, wherein said bobbin has flanges adjacent opposite ends thereof engaging and preventing axial movement of said coil relative to said bobbin, said flanges having a press-fit engaging relationship with said cover member.

26. A transducer as in claim 25, wherein said cover member has a main body formed of ferrous material, and wherein said body is substantially magnetically saturated by said flux field.

* * * * *